Sept. 26, 1944. S. VORECH 2,358,895
VEHICLE CONTROL MECHANISM
Filed April 10, 1943
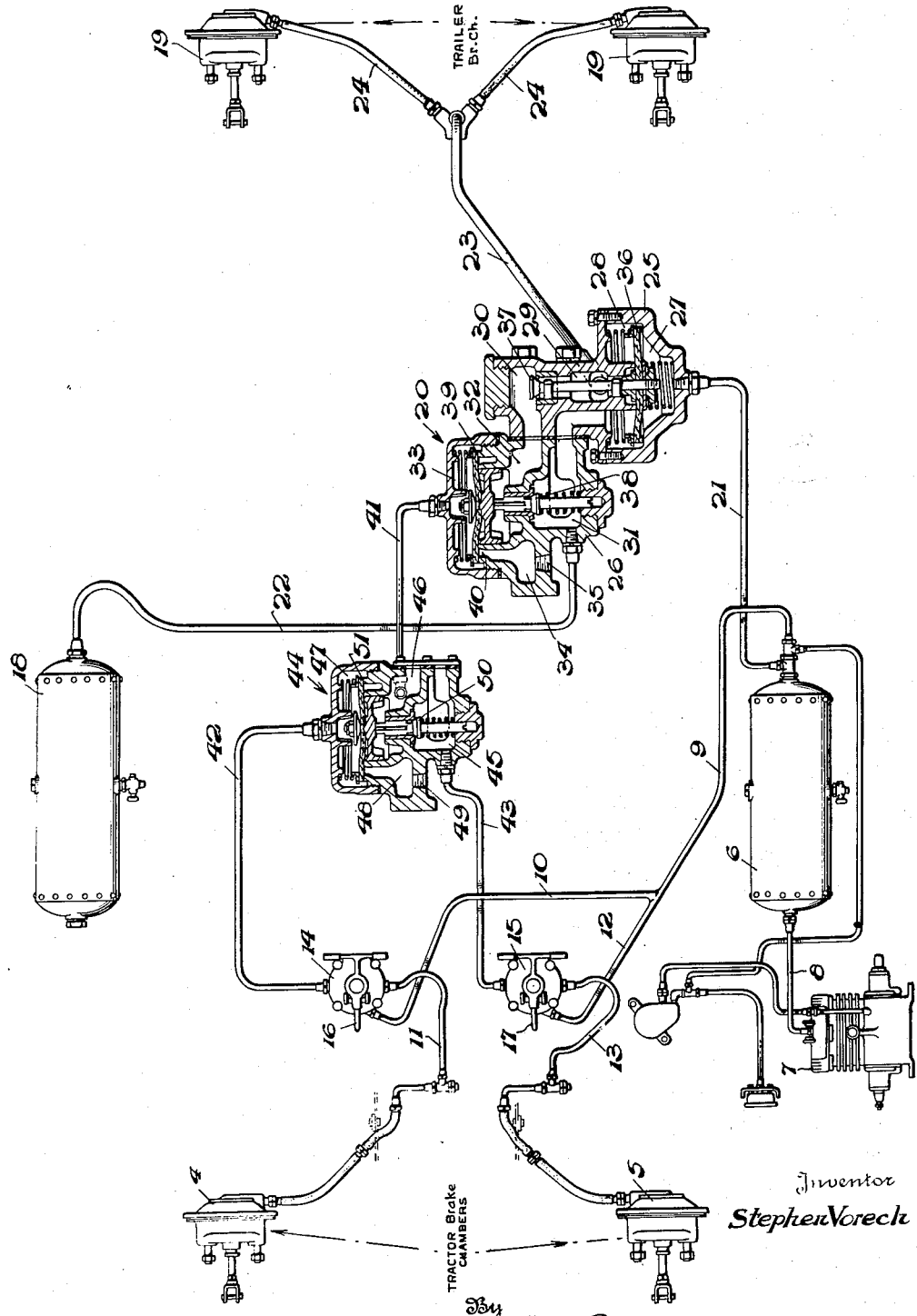
Inventor
Stephen Vorech
By N. D. Parker Jr. Attorney Patented Sept. 26, 1944

2,358,895

UNITED STATES PATENT OFFICE 2,358,895

VEHICLE CONTROL MECHANISM

Stephen Vorech, Elyria, Ohio, assignor to Bendix-Westinghouse Automotive Air Brake Company, Elyria, Ohio, a corporation of Delaware Application April 10, 1943, Serial No. 482,623

10 Claims. (Cl. 188—3)

This invention relates to control mechanisms for brake systems and more particularly to control mechanisms for brake systems on so-called tractor-trailer trains of the type wherein the brakes of the tractor are utilized to assist in steering of the vehicle.

Systems of the above type have been heretofore proposed for use on tractor vehicles only wherein the brake mechanism has been utilized for both braking and steering of the tractor, but it has been difficult to utilize such an arrangement in connection with tractor-trailer trains, in view of the fact that it was undesirable to selectively control the right and left brakes on the trailer when the corresponding brakes on the tractor were selectively operated for the purpose of steering the vehicle.

It is accordingly an object of the present invention to provide means under the control of the operator for controlling the tractor brakes to either steer or retard the motion of the vehicle, and at the same time to control the operation of the trailer brakes for retardation purposes only.

Another object of the invention is to provide means for permitting the operator to control the entire operation of the brakes for steering and braking by the operation of two simple controls.

These and other objects of the invention will be more readily apparent when taken in connection with the accompanying drawing, wherein one form of the invention is illustrated. It is to be expressly understood, however, that the drawing is employed for purposes of illustration only, and is not designed as a definition of the limits of the invention, reference for this purpose being had to the appended claims.

In the drawing the single view is a diagrammatic representation, partially in section, of a fluid pressure brake system for a tractor-trailer train constructed in accordance with the principles of the present invention.

The invention is illustrated as including on the tractor, not shown, a pair of right and left brake actuators, 4 and 5 respectively, a fluid pressure reservoir 6 adapted to be supplied with fluid under pressure from a compressor 7 through a conduit 8, the reservoir in turn being adapted for connection with the brake actuators 4 and 5 through conduits 9, 10 and 11, and 9, 12 and 13 respectively, interconnected therebetween. The connection between the reservoir 6 and the brake actuator 4 and between the brake actuator and atmosphere is preferably controlled by means of a self-lapping brake valve 14, which is preferably constructed in accordance with the principles set forth in the patent to W. A. Eaton, No. 2,204,530, dated June 11, 1940, a similarly constructed brake valve 15 being associated with the connection leading from the reservoir to the left brake actuator 5. As will be understood from a perusal of the above patent, the brake valves may be provided with operating levers 16 and 17 respectively, and on operation of the lever 16, for example, to effect a brake application, the brake valve 14 serves to establish a connection between conduits 10 and 11 to permit the reservoir 6 to supply fluid pressure to the actuator at a pressure determined by the degree of movement of the lever 16. Likewise on release movement of the lever 16, the valve serves to prevent communication between conduits 10 and 11 and to establish a connection between the conduit 11 and an atmospheric port, not shown, thus exhausting fluid pressure from the actuator 4 and effecting a release of the brakes. Thus on operation of the right brake valve 14, fluid under pressure is supplied to the actuator 4 through conduits 9, 10, valve 14 and conduit 11, and on release operation of the brake valve, fluid pressure is released to atmosphere through conduit 11 and the valve 14, while on similar operation of the left-hand brake valve 15, fluid pressure is supplied to the actuator 5 through conduit 9, conduit 12, brake valve 15 and conduit 13, and is released to atmosphere through conduit 13 and the valve 15.

The trailer is likewise provided with a fluid pressure brake mechanism comprising generally a fluid pressure reservoir 18, a pair of brake actuators 19, and a relay-emergency valve mechanism generally designated by the numeral 20, and preferably constructed in accordance with the principles set forth in the patent to Stephen Johnson, Jr., No. 2,018,212, dated October 22, 1935. The reservoir 18 is supplied with fluid under pressure from the tractor reservoir 6 through the medium of a conduit 21, the valve 20 and conduit 22, while fluid pressure is supplied to the trailer brake actuators 19 from the reservoir 18 through conduit 22, valve 20, and conduits 23 and 24. As explained more fully in the above referred to patent, the valve mechanism 20 is provided with an emergency valve casing 25, and a relay valve casing 26 attached thereto, the emergency valve casing 25 being provided with a chamber 27 connected with the conduit 21, a chamber 28, an outlet chamber 29 and a chamber 30, while the relay valve casing 26 is provided with an inlet chamber 31, an outlet chamber 32, a diaphragm chamber 33 and an exhaust chamber 34 provided with an exhaust port 35 serving to connect said chamber to atmosphere. As described in the patent, the chambers 27 and 28 are normally separated by means of a flexible diaphragm 36, the latter also serving at its center to separate the chamber 28 from the outlet chamber 29. A valve 37, actuated by the diaphragm 36 normally permits communication between the outlet chamber 29 and the chamber 30, and is adapted on downward movement of the diaphragm to close the connection between these chambers, the central portion of the diaphragm at the same time serving to establish a connection between chambers 28 and 29. With regard to the chambers in the relay valve casing, the inlet chamber 31 is in register with a portion of the emergency valve casing chamber 28 and is connected with the trailer reservoir 18 through the medium of conduit 22, while the outlet chamber 32 of the relay valve casing is in register with a portion of the chamber 30 in the emergency valve casing. The relay valve casing is provided with an intake valve 38, normally serving to prevent communication between chambers 31 and 32, and adapted to be actuated by means of a flexible diaphragm 39 positioned between chambers 32 and 33 and subjected to the fluid pressure in both chambers. An annular exhaust port 40 is formed in the relay valve casing 26 and normally closed by the lower face of the diaphragm 39, the construction of the valve being such that on the admission of fluid pressure to the diaphragm chamber 33, the diaphragm is moved downward to open the intake valve 38 and establish a connection between the inlet chamber 31 and the outlet chamber 32, thus establishing a connection between the reservoir 18 and the trailer brake actuators 19 through the medium of conduit 22, inlet chamber 31, open valve 38, outlet chamber 32 of the relay valve casing 26, chamber 30 of the emergency valve casing 25, open valve 37, outlet chamber 29 and conduits 23 and 24. On the release of pressure from the diaphragm chamber 33, the pressure in the outlet chamber 32 of the relay valve serves to move the diaphragm 39 upward, thus permitting the outer portion of the diaphragm to leave the upper end of the exhaust port 40 and permit air to flow from the brake actuators 19 to atmosphere through conduit 24, conduit 23, outlet chamber 29 of the emergency valve casing 27, open valve 37, chamber 30, outlet chamber 32 of the relay valve, valve port 40, exhaust chamber 34 and exhaust port 35.

With regard to the air supplied to the relay emergency reservoir 18, the chamber 27 is connected with the reservoir 6 on the tractor through the medium of the conduit 21, and since the diaphragm 36 is made of flexible material, the pressure in the chamber 27 forces the periphery of the diaphragm away from the casing, thus permitting the passage of fluid pressure from the chamber 27 to the chamber 28, but preventing the passage of fluid pressure in the other direction. The chamber 28 is in register with the chamber 31 of the relay valve casing, and thus fluid under pressure is supplied to the reservoir 18 through the chamber 31 and the conduit 22. In the event of breakage of the line 21, the pressure in the chamber 27 is depleted, with the result that the greater pressure in the chamber 28 forces the diaphragm 36 downward at its center, thus closing the valve 37 to prevent communication between the outlet chamber 29 and the atmospheric port of the relay valve, and at the same time establishing communication between the chamber 28 and the outlet chamber 29 and thence to the brake actuators through conduits 23 and 24 to permit operation of the brake actuators 19 by fluid pressure from the reservoir 18. This latter feature is of course inoperative except on failure of the conduit 21 or the other conduits connected thereto.

It will thus be seen that the valve mechanism 20, in addition to functioning as an emergency brake valve in the event of failure of one of the supply conduits, also acts to control the pressure in the trailer brake actuators 19, and in order that this control may be brought under the control of the operator, the diaphragm chamber 33 of the relay valve portion is connected for control by the operator-controlled brake valve 14 through the medium of conduits 41 and 42, and by the left-hand brake valve 15 through the medium of conduits 41 and 43. Conduits 42 and 43 are connected with the outlet chambers of the brake valves in the same manner as the conduits 11 and 13 leading to the tractor brake actuators 4 and 5 respectively, so that the same degree of fluid pressure obtains in conduits 42 and 43 as in conduits 11 and 13 on operation of the brake valves to control the operation of the tractor brakes.

In order that the operation of the valve mechanism 20 may be satisfactorily controlled by the operation of the brake valves 14 and 15, the conduits 41, 42 and 43 are connected to a suitable relay valve mechanism 44, constructed in the same manner as the relay valve portion of the valve mechanism 20. Thus the relay valve 44 is provided with an inlet chamber 45, an outlet chamber 46, a diaphragm chamber 47 and an exhaust chamber 48 connected to atmosphere through the medium of an exhaust port 49. Communication between the inlet chamber 45 and the outlet chamber 46 is normally prevented by means of an intake valve 50, while the outlet chamber 46 is normally closed off from communication with the exhaust chamber 48 by means of a pressure responsive diaphragm 51 operating in the same manner as the diaphragm 39 already described in connection with the valve mechanism 20. The conduit 41 serves to connect the outlet chamber 46 of the relay valve with the diaphragm chamber 33 of the valve mechanism 20, the diaphragm chamber 47 of the relay valve 44 being connected with the brake valve 14 through the conduit 42, and the inlet chamber 45 of the relay valve being connected with the brake valve 15 through conduit 43.

It will be noted from the foregoing description, that with the parts in the position shown, the valve mechanism 44 serves to prevent communication between the conduits 42 and 41, as well as between the conduits 43 and 41, and consequently either of the brake valves 14 or 15 may be operated selectively and individually by the operator for controlling the right or left brakes of the tractor without in any way affecting the operation of the valve 20 to control the operation of the trailer brakes. For example, on operation of the valve 14 to supply fluid pressure to the actuator 4, fluid pressure is also supplied to the chamber 47 through conduit 42, thus opening the intake valve 50 to establish communication between the conduit 43 and the conduit 41, but in view of the fact that the valve 15 is not being operated, there is no change in the pressure obtaining in the chamber 33 of the valve mechanism 20 and no control is exerted over the operation of the trailer brake actuators. In like manner, the valve 15 may be operated to supply fluid pressure to the actuator 5, but unless the valve 14 is operated concurrently therewith, the intake valve 50 will remain in closed position and no change of pressure will occur in the conduit 41 or in the diaphragm chamber 33 of the valve mechanism 20. If, on the other hand, both of the brake valves 14 and 15 are concurrently operated to supply fluid pressure to the tractor brake actuators for effecting a brake application to retard the motion of the vehicle, the pressure supplied to the chamber 47 of the relay valve will serve to open the intake valve and establish a connection between conduits 43 and 41, while the fluid pressure supplied to the inlet chamber 45 of the relay valve through conduit 43, will be supplied to the chamber 33 of the valve 20 through conduit 41, thus opening the intake valve 38 to establish communication between the inlet chamber 31 and the outlet chamber 29 to effect a corresponding application of the trailer brakes.

It is pointed out that in the operation of this mechanism, the operator may desire to effect the partial application of all the brakes on the vehicle, in which case he may, for example, actuate the brake levers 16 and 17 to supply a pressure of 10 pounds to the brake actuators 4 and 5, this likewise serving to supply a pressure of substantially 10 pounds to the chambers 45 and 47 of the relay valve 44, the result being that a pressure of substantially 10 pounds will likewise be available in the conduit 41 to actuate the diaphragm 39 of the relay emergency valve 20, this pressure acting on the diaphragm serving to establish a connection between the conduit 22 and the conduit 23 to supply a corresponding pressure to the trailer brake actuators 19. It is quite possible that under this type of operation, while still retaining the 10 pound pressure on all of the brake actuators, the operator may wish to increase the degree of brake application on one side of the tractor in order to effect the steering of the vehicle when on a down grade, in which case he has only to increase the pressure in the right brake actuator 4, for example, by further operation of the control lever 16, whereupon the increased pressure is likewise supplied to the diaphragm chamber 47 of the relay valve through the conduit 42, but does not serve to effect an increase in pressure in the trailer brake actuators, due to the fact that the supply pressure to the inlet chamber 45 of the relay valve is the same as that still being delivered by the brake valve 15 to the left tractor actuator 5. In like manner, if the right brake valve is adjusted to supply a pressure of 10 pounds to the right brake actuator, and it is then desired to adjust the left brake valve to supply an increase in pressure to the left brake actuator of the tractor, the increased pressure will be available through conduit 43 in the inlet chamber 45 of the relay valve, but will not be available in the conduit leading from the outlet chamber 46 of the relay valve to the diaphragm chamber 33 of the valve 20, in view of the well-known self-lapping action of the valve mechanism 44 as more fully explained in the above referred to Johnson patent, it being apparent that in the event the intake valve 50 remains open long enough to permit an increase in pressure in the chamber 46 above that for which the brake valve 14 is set, this increased pressure acting on the diaphragm 51 will be sufficiently greater than the pressure obtaining in the chamber 47 to force the diaphragm upward and permit closing of the intake valve 50 to prevent any further increase in pressure in the outlet chamber 46 and the conduit 41. Thus, in any situation where the operator desires to supply unequal pressures to the brake actuators on the tractor, the pressure in the trailer brake actuators will substantially correspond to the lower of the two pressures, thus giving the operator combined control of steering and brakes on the entire vehicle under all operating conditions.

Although the invention has been illustrated and described herein with considerable particularity, it is to be understood that the same is not limited to the form shown but may receive a variety of mechanical expressions, as will readily appear to those skilled in the art. Reference will, therefore, be had to the appended claims for a definition of the limits of the invention.

What is claimed is:

1. The combination in a fluid pressure brake system for a tractor-trailer vehicle of the type wherein the tractor brakes are selectively and individually operated to steer the tractor, of a source of fluid pressure, right and left tractor brake actuators, right and left operator-controlled means for selectively connecting said source and actuators for controlling the operation of the corresponding tractor brakes, a brake actuator on the trailer, valvular means for connecting the source with said trailer brake actuator for effecting operation of the trailer brakes, and valvular means controlled by the operation of said operator-controlled means for rendering said first named valvular means effective to connect said source and trailer brake actuator when said operator-controlled means are operated concurrently to effect a substantially equal degree of actuation of said tractor brakes.

2. The combination in a fluid pressure brake system for a tractor-trailer vehicle wherein the tractor brakes are selectively and individually operated to steer the tractor, of a source of fluid pressure, right and left tractor brake actuators, right and left operator-controlled means for selectively connecting said source and actuators for controlling the operation of the corresponding tractor brakes, a brake actuator on the trailer, valvular means for connecting the source with said trailer brake actuator for effecting operation of the trailer brakes, and means for controlling the operation of said first named valvular means including a valve operable for establishing a connection between one of said operator-controlled means and the first named valve means for rendering the latter effective to establish a connection between said source and said trailer brake actuator and means responsive to the pressure delivered by said other operator controlled means to the corresponding brake actuator for controlling the action of said valve.

3. The combination in a power brake system for a tractor-trailer vehicle having right and left tractor brakes and trailer brakes wherein the tractor brakes are selectively and individually operated to steer the tractor, of separate operator-controlled means for controlling the application of power to the right and left tractor brakes respectively, means for supplying power to the trailer brakes, and means controlled by the operation of one of the operator-controlled means for rendering the other operator-controlled means effective to control said supplying means to control the application of power to the trailer brakes.

4. The combination in a brake system for a tractor-trailer vehicle having right and left brakes on the tractor and brakes on the trailer wherein the tractor brakes are selectively and individually operated to steer the tractor, of right and left operator-controlled means for selectively actuating said tractor brakes, and means controlled by the operation of one of said operator-controlled means for rendering said other operator-controlled means effective for controlling the operation of said trailer brakes.

5. The combination in a fluid pressure brake system for a tractor-trailer vehicle having tractor and trailer brakes wherein the tractor brakes are selectively and individually operated to steer the tractor, of a source of fluid pressure, right and left tractor brake actuators, right and left operator-controlled means for connecting said source and actuators for controlling the operation of the corresponding tractor brakes and operable for establishing unequal pressures in said right and left actuators, a brake actuator on the trailer, valvular means for connecting the source with said trailer brake actuator for effecting operation of the trailer brakes, and valvular means controlled by the operation of said operator-controlled means for rendering said first named valvular means effective to connect said source and trailer brake actuator for establishing the lesser of said pressures therein.

6. The combination in a power brake system for a tractor-trailer vehicle having right and left tractor brakes and trailer brakes, of separate and individual operator-controlled means operable separately for selectively supplying power to one or the other of said tractor brakes for steering the vehicle and operable concurrently for supplying power to both of said tractor brakes to retard the movement of the vehicle, and means controlled by the operation of said operator-controlled means for supplying power to the trailer brakes when power is supplied to both the tractor brakes and for preventing the supplying of power to the trailer brakes when power is supplied to only one of the tractor brakes.

7. The combination in a brake system for a tractor-trailer vehicle of the type having right and left brakes on the tractor and brakes on the trailer, of separate and individual operator-controlled means operable separately for selectively and separately operating the tractor brakes for steering the tractor and operable concurrently for operating both of the tractor brakes for retarding the movement of the tractor, and means controlled by said operator-controlled means for rendering the trailer brakes ineffective during separate operation of the tractor brakes and effective during concurrent operation thereof.

8. The combination in a fluid pressure brake system for a tractor-trailer vehicle having right and left tractor brakes and brakes on the trailer, of a source of fluid pressure, right and left tractor brake actuators, a trailer brake actuator, means including operator-controlled valvular mechanism for selectively supplying fluid under pressure from said source to said tractor brake actuators separately or concurrently, and means including a valve controlled by the operation of said operator-controlled means for supplying fluid under pressure from said source to said trailer brake actuator during operation of said operator-controlled means to supply fluid to said tractor brake actuators concurrently and for preventing the supplying of fluid from said source to said trailer brake actuator when fluid is supplied to either of said tractor brake actuators separately.

9. The combination in a brake system for a tractor-trailer vehicle having right and left brakes on the tractor, and brakes on the trailer, of operator-controlled means for applying the trailer brakes and one of the tractor brakes, separate operator-controlled means for applying the other tractor brake, and means controlled by the operation of said second named operator-controlled means for rendering the first named operator-controlled means effective or ineffective to apply the trailer brakes.

10. The combination in a power brake system for a tractor-trailer vehicle having right and left tractor brakes and trailer brakes, of operator-controlled means for applying power to either of said tractor brakes in a degree greater than that applied to the other tractor brake, and means controlled by the operation of said operator-controlled means for applying power to said trailer brakes in a degree substantially equal to that supplied to said other tractor brake.

STEPHEN VORECH.